No. 783,912. PATENTED FEB. 28, 1905.
F. M. THOMPSON.
VELOCIPEDE.
APPLICATION FILED APR. 30, 1904.

2 SHEETS—SHEET 1.

WITNESSES:
Jos. A. Ryan
Perry B. Turpin

INVENTOR
Frank M. Thompson
BY Munn & Co.
ATTORNEYS

No. 783,912. PATENTED FEB. 28, 1905.
F. M. THOMPSON.
VELOCIPEDE.
APPLICATION FILED APR. 30, 1904.

2 SHEETS—SHEET 2.

WITNESSES:
Jos. A. Ryan
Perry B. Turpin

INVENTOR
Frank M. Thompson
BY Munn & Co.
ATTORNEYS

No. 783,912.

Patented February 28, 1905.

UNITED STATES PATENT OFFICE.

FRANK M. THOMPSON, OF EAST LIVERPOOL, OHIO, ASSIGNOR OF ONE-FIFTH TO WILLIAM H. MIGHT AND TWO-FIFTHS TO JOHN W. GORRELL, OF EAST LIVERPOOL, OHIO.

VELOCIPEDE.

SPECIFICATION forming part of Letters Patent No. 783,912, dated February 28, 1905.

Application filed April 30, 1904. Serial No. 205,660.

*To all whom it may concern:*

Be it known that I, FRANK M. THOMPSON, a citizen of the United States, residing at East Liverpool, in the county of Columbiana and State of Ohio, have made certain new and useful Improvements in Velocipedes, of which the following is a specification.

My invention is an improvement in velocipedes, being in the nature of a combination, with a carriage in the form of a sulky, of the figure of an imitation horse, having legs connected with the propelling devices of the carriage in such manner as to be operated as the carriage is propelled and the legs being so formed as to simulate the action of a horse; and the invention consists in certain novel constructions and combinations of parts, as will be hereinafter described and claimed.

Figure 1:
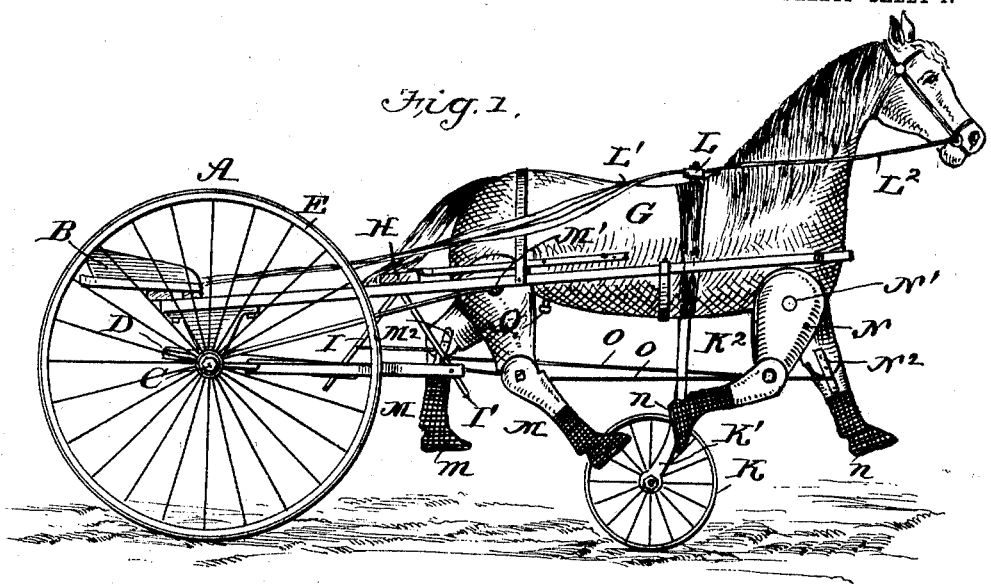
Figure 2:
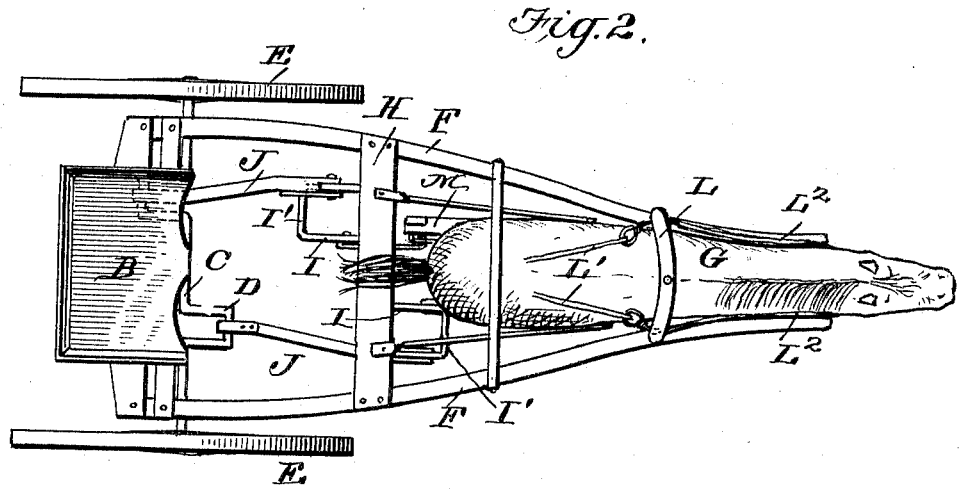
Figure 3:
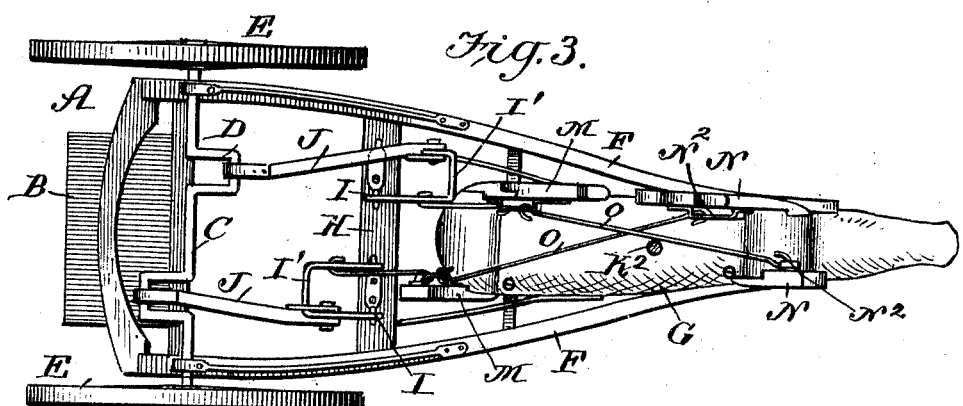
Figure 4:
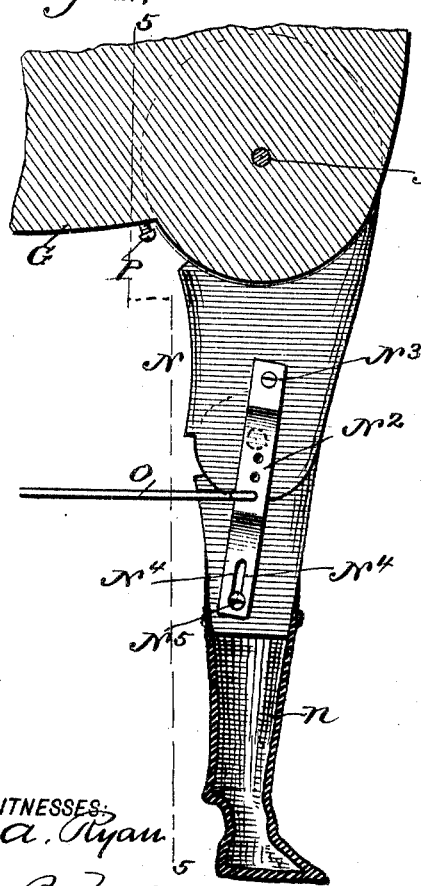
Figure 5:
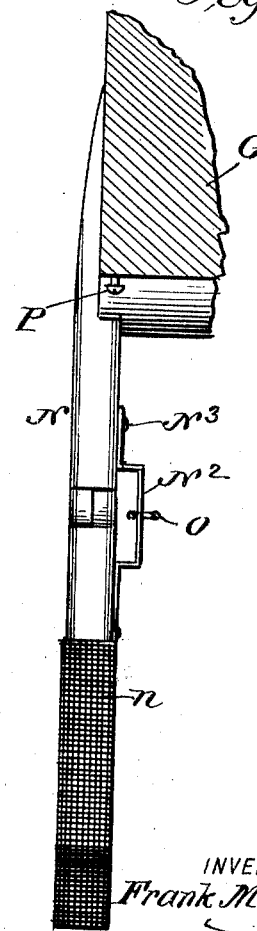

In the drawings, Figure 1 is a side elevation, and Fig. 2 a top plan view, of an apparatus embodying my invention. Fig. 3 is a partial bottom plan view of a velocipede. Fig. 4 is an elevation of the inner side of one of the front legs of the horse, a portion of the body being shown in section; and Fig. 5 is a detail section on about line 5 5 of Fig. 4, the rear side of the front leg being shown in elevation.

As shown, the carriage A is in the form of a sulky, having a seat B, an axle C, having cranks D, and wheels E, one of which is fixed to the axle, so it may be driven thereby, the other wheel being ordinarily free on the axle, so the device can be readily turned.

The carriage is provided with the shafts F, between which the horse G is secured, and these shafts are connected slightly in advance of the seat B by a cross-bar H, to which are pivoted at their upper ends the treadles I, whose lower ends at I' form pedals, and which treadles are connected near their lower ends by the pitmen J with the cranks D of the axle C. By this construction the treadles as they are operated by the feet of the child on the seat B serve to propel the vehicle. The horse G is mounted upon the steering-wheel K, mounted in a fork K', whose shaft K² is journaled in the body of the horse and is provided above the horse with a cross-lever L, to the opposite ends of which are secured the driving-reins L', lines L² extending from the opposite ends of the lever L forwardly and through the mouth of the horse, so the lever L can readily rock by the operation of the lines L' in order to steer the velocipede as desired. The treadles I are connected with the hind legs M of the horse on the same side as the respective treadles, and the hind legs M are connected with the front legs N by rods O, which may be crossed, as shown, by extending the line O from the right hind leg to the left forward leg and from the left hind leg to the right forward leg in order to give the horse a trotting action. If desired to give the horse a pacing action, it is only necessary to connect together the front and hind legs on the same side, which can be done by the rods O being properly connected, as will be understood from the drawings.

The legs M M are alike, as are the legs N N, and description of one of each of said legs will answer for both. In practice I make the legs, both front and rear, in upper and lower sections pivoted together at P, the upper end of the lower leg-section being pivoted to the lower end of the upper leg-section, and the upper leg-sections M and N are pivoted at M' and N' to the body. I also provide links M² and N², which extend between the upper leg-sections and the lower leg-sections and pass the pivot between such sections and preferably serve as connections for the opposite ends of the rod O. These connecting-links M² and N² are alike and description of one — such, for instance, as that shown in Fig. 4 — will answer for all. The link N² is connected at N³ with one leg-section, extends thence past the pivot between the upper and lower leg-sections, and is slidably connected at its other end at N⁴ with the other leg-section. As shown, the slidable connection is effected by means of a screw N⁵, operating in a slot N⁶. In practice I may prefer to make the pivots M' and N' a little freer than the pivots between the upper leg-section and the lower leg-section, so that the leg will swing more freely on its connection with the body than it will at the joint between its upper and lower section. By this means the rods will operate to swing the legs first on the pivots M' and N' and then after giving the full movement to the leg will swing the lower leg-section on its jointed connection with the upper leg-section in such manner as to give the knee action. Furthermore, in order to vary the knee action I prefer to provide stops P for the front legs and Q for the rear legs the stops P being in rear of the front legs and the stops Q in front of the rear legs and said stops being preferably adjustable, so the upper leg-sections may be stopped at different points in order to vary the action at the knee, as may be desired. In the operation of this construction it will be noticed that the links $M^2$ and $N^2$ being pivoted at $N^3$ and the operating-rods being connected with said links the motion will be first transmitted to the upper leg-section and then when the latter has been stopped to the lower leg-section, as will be understood from Fig. 4 of the drawings. I find it desirable to construct the lower leg-sections with flexible foot extensions $n$ and $m$, which may be of yielding rubber in order to avoid injury in case the leg should strike bricks, stones, or other obstructions in the use of the invention.

Having thus described my invention, what I claim as new, and desire to secure by Letters Patent, is—

1. In an apparatus substantially as described, the combination of the carriage having a crank-axle, the imitation horse connected with the carriage and having a body and front and rear legs composed each of upper sections pivoted at their upper ends to the body and lower sections pivoted at their upper ends to the lower ends of the upper sections, adjustable devices for limiting the movement of the upper leg-sections in connection with the body, links pivoted at their upper ends to the upper leg-sections and slidable at their lower ends in connection with the lower leg-sections, the rods connecting the links of the rear legs with the links of their respective front legs, the treadles connected with the cranks of the axle and connections between the treadles and the legs of the horse and steering devices, substantially as set forth.

2. The combination in an apparatus substantially as described with the figure in imitation of a horse having a body and legs composed of lower and upper sections, the upper leg-sections being pivoted to the body and the lower sections being pivoted at their upper ends to the lower ends of the upper leg-sections, the links extending between the upper and lower leg-sections and past the pivot-joints between said sections and slidably connected with one of said leg-sections, and operating devices connected with said links, substantially as set forth.

3. The combination with the figure as of a horse having body and legs composed of upper and lower sections pivoted together and the upper leg-sections being pivoted to the body, of operating devices arranged to swing the leg bodily and also to swing the lower leg-section on its pivotal joint with the upper leg-section, and adjustable stop devices for limiting the extent of movement of the upper leg-sections, substantially as set forth.

4. The combination of the carriage having a crank-axle and shafts, a horse between the shafts, and a cross-bar between the shafts in rear of the horse, said horse having legs composed of upper and lower sections jointed together, and the upper sections being jointed to the body of the horse, the treadles pivoted at their upper ends to the cross-bar, pitmen connecting said treadles with the cranks of the axle and operating connections between said treadles and the legs, substantially as set forth.

5. In an apparatus substantially as described, the combination with the imitation figure of a horse having a body and legs composed of upper and lower sections jointed together and the upper sections being jointed to the body of the horse, of links connected with the upper and lower leg-sections and extending past the pivotal joint between such sections, one end of each link being slidably connected with its respective leg-section and operating devices connected with said links, substantially as set forth.

6. The combination with the body of the imitation horse, of the legs composed of upper sections pivoted at their upper ends to the body of the horse and lower sections pivoted at their upper ends to the lower ends of the upper sections, set-screws for limiting the movements of the upper leg-sections and operating devices for moving the legs bodily and then for moving the lower leg-sections on their pivotal joint with the upper leg-sections, substantially as set forth.

FRANK M. THOMPSON.

Witnesses:
SOLON C. KEMON,
PERRY B. TURPIN.